(12) United States Patent
Annett et al.

(10) Patent No.: US 8,976,136 B2
(45) Date of Patent: Mar. 10, 2015

(54) PROXIMITY-AWARE MULTI-TOUCH TABLETOP

(71) Applicant: Autodesk, Inc., San Rafael, CA (US)

(72) Inventors: Michelle Annett, Edmonton (CA); Tovi Grossman, Toronto (CA); Daniel Wigdor, Littleton, MA (US); George Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 159 days.

(21) Appl. No.: 13/651,263

(22) Filed: Oct. 12, 2012

(65) Prior Publication Data
US 2013/0100057 A1    Apr. 25, 2013

Related U.S. Application Data

(60) Provisional application No. 61/546,947, filed on Oct. 13, 2011.

(51) Int. Cl.
*G09G 5/00* (2006.01)
*G06F 3/041* (2006.01)
*G06F 3/042* (2006.01)

(52) U.S. Cl.
CPC .............. *G06F 3/041* (2013.01); *G06F 3/0421* (2013.01); *G06F 3/0425* (2013.01); *G06F 2203/04104* (2013.01); *G06F 2203/04108* (2013.01); *G06F 2203/04808* (2013.01)
USPC .......................................... 345/173; 715/863

(58) Field of Classification Search
CPC ....... G06F 3/011; G06F 3/0488; G06F 3/041; G06F 3/0421; G06F 3/0425; G06F 2203/04104; G06F 2203/04108; G06F 2203/04808

USPC ................. 345/173; 178/18.03–18.07, 18.09, 178/18.11; 715/863, 864
See application file for complete search history.

(56) References Cited

U.S. PATENT DOCUMENTS

| 5,515,083 | A  | * | 5/1996 | Casebolt et al. | ............. 345/175 |
| 5,707,160 | A  | * | 1/1998 | Bowen | .......................... 400/472 |
| 6,798,402 | B1 | * | 9/2004 | Takano et al. | ................. 345/173 |
| 7,519,223 | B2 |   | 4/2009 | Dehlin et al. | |
| 8,224,258 | B2 | * | 7/2012 | Jeon et al. | ..................... 455/67.7 |
| 8,319,751 | B2 | * | 11/2012 | Challener et al. | ............. 345/175 |

(Continued)

OTHER PUBLICATIONS

International Search Report and Written Opinion for PCT/US12/60103 dated Jan. 9, 2013.

*Primary Examiner* — Tom Sheng
(74) *Attorney, Agent, or Firm* — Artegis Law Group, LLP

(57) ABSTRACT

A proximity-aware multi-touch tabletop is disclosed that includes both a touch screen display and proximity sensors. The proximity sensors are disposed in one or more annular groups around the touch screen display and are positioned in upward-and outward-facing directions. The proximity sensors allow the multi-touch tabletop to sense the distance of a body, arm, hand, or fingers of a user from the multi-touch tabletop. Thus, hand, arm, and finger positions of a user can be determined relative to the body position of the user, which enables the multi-touch tabletop to differentiate between left hand/arm gestures and right hand/arm gestures. Further, because the multi-touch tabletop can correlate left arm and right arm movements to a user body, the multi-touch tabletop can differentiate gestures originating from different users. The ability of the multi-touch tabletop to distinguish between users greatly enhances user experiences, particularly in a multi-user environment.

18 Claims, 11 Drawing Sheets

(56) References Cited

U.S. PATENT DOCUMENTS

| | | | |
|---|---|---|---|
| 2008/0055271 A1* | 3/2008 | Yamaguchi et al. | 345/173 |
| 2008/0150911 A1* | 6/2008 | Harrison | 345/173 |
| 2008/0158172 A1 | 7/2008 | Hotelling et al. | |
| 2009/0021488 A1* | 1/2009 | Kali et al. | 345/173 |
| 2009/0079765 A1 | 3/2009 | Hoover | |
| 2010/0053116 A1 | 3/2010 | Daverman et al. | |
| 2010/0110027 A1* | 5/2010 | Lipman et al. | 345/173 |
| 2010/0225595 A1* | 9/2010 | Hodges et al. | 345/173 |
| 2011/0141066 A1* | 6/2011 | Shimotani et al. | 345/177 |
| 2011/0227874 A1* | 9/2011 | Fahraeus et al. | 345/175 |
| 2011/0242033 A1* | 10/2011 | Kim et al. | 345/173 |

* cited by examiner

PROXIMITY-AWARE MULTI-TOUCH TABLETOP

CROSS-REFERENCE TO RELATED APPLICATIONS

This application claims benefit of U.S. Provisional Patent Application Ser. No. 61/546,947, filed Oct. 13, 2011, which is herein incorporated by reference.

BACKGROUND OF THE INVENTION

1. Field of the Invention

Embodiments of the present invention generally relate to touch screen devices and, more specifically, to a proximity-aware multi-touch tabletop system.

2. Description of the Related Art

Multi-touch tabletops are computing devices that include a large touch screen display on a horizontal plane. Multi-touch tabletops, however, suffer from several drawbacks. First of all, multi-touch tabletops cannot recognize when multiple users are interacting with the multi-touch tabletop, and moreover, cannot differentiate commands initiated by different users. Furthermore, when multiple users are interacting with a multi-touch tabletop, the multi-touch tabletop is not able to properly orient displayed content on the touch screen based on which user is currently interacting with the multi-touch tabletop. As a result, collaborative efforts by multiple users using a multi-touch tabletop are oftentimes cumbersome and, consequently, result in dissatisfactory user experiences.

As the foregoing illustrates, what is needed in the art is a multi-touch tabletop design that provides more satisfactory multi-user experiences.

SUMMARY OF THEN INVENTION

In one embodiment, a method of processing user data relative to a multi-touch tabletop is disclosed. The method includes receiving a first signal from a first ring of proximity sensors and receiving a second signal from a second ring of proximity sensors. In response to receiving the first signal and the second signal, an instruction is generated.

One advantage of the disclosed multi-touch tabletop and software is that the multi-touch tabletop and software enable enhanced user experiences, particularly when multiple users are interacting with the multi-touch tabletop in a collaborative manner. Specifically, the disclosed multi-touch tabletop and software are able to differentiate interactions between particular users and can orient content on a display screen appropriately.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
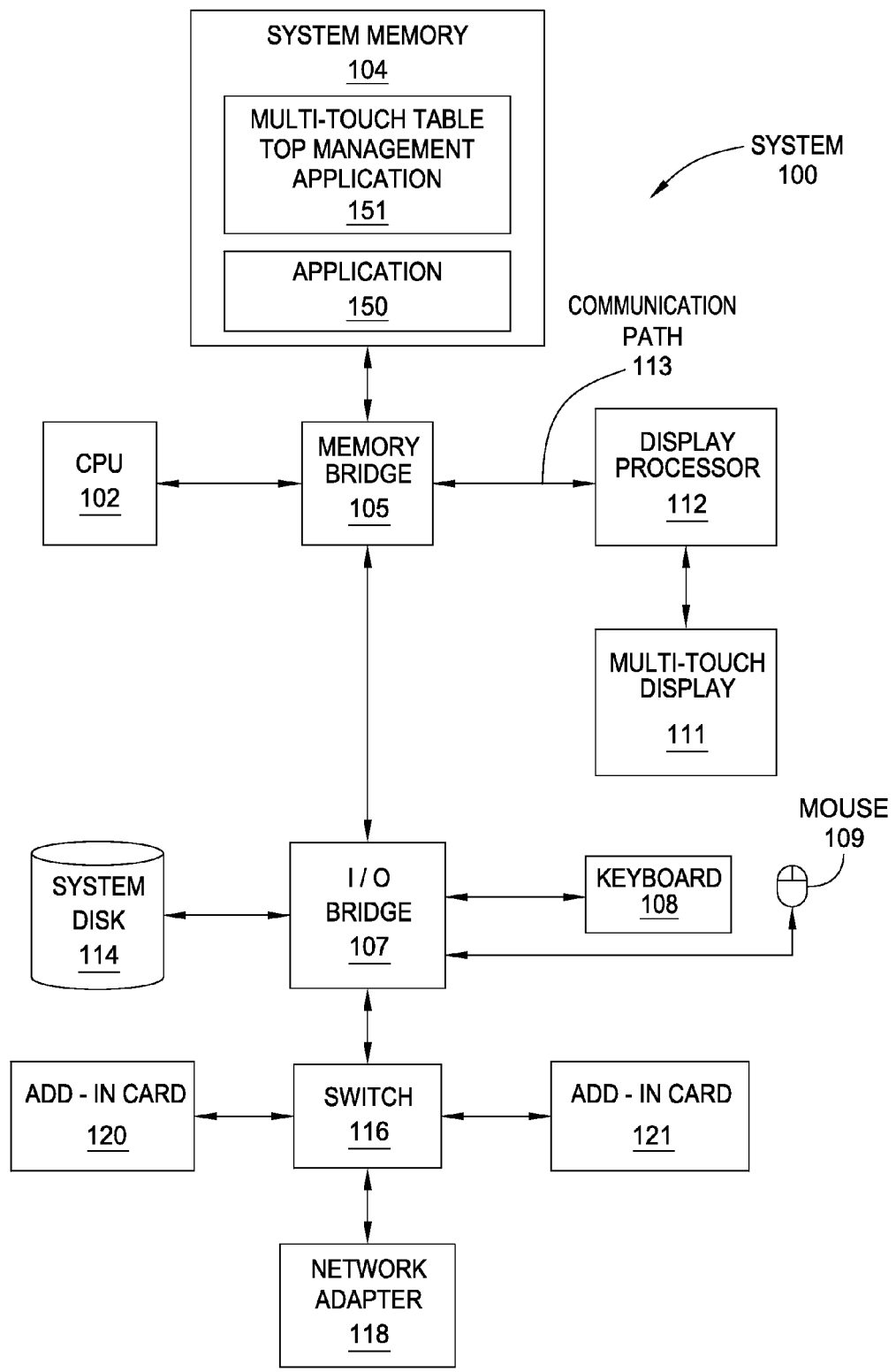
FIG. 1 is a block diagram of a system configured to implement one or more aspects of the invention.

FIG. 1 is a block diagram of a system 100 configured to implement one or more aspects of the invention. System 100 is a multi-touch tabletop display; however, it is contemplated that system 100 may also be a personal computer, video game console, personal digital assistant, mobile phone, mobile device or any other device suitable for practicing one or more embodiments of the present invention.

System 100 includes one or more processing units, such as central processing unit (CPU) 102, and a system memory 104 communicating via a bus path that includes a memory bridge 105. The CPU 102 includes one or more processing cores, and, in operation, the CPU 102 is the master processor of the system 100, controlling and coordinating operations of other system components. The system memory 104 stores data and software applications, such as application 150 and multi-touch tabletop management application 151, for use by the CPU 102. The CPU 102 runs software applications and optionally an operating system. The application 150 may be any application configured to display a graphical user interface on the multi-touch display device 111.

The memory bridge 105, which may be, for example, a Northbridge chip, is connected via a bus or other communication path (e.g., a HyperTransport link) to an input/output (I/O) bridge 107. The I/O bridge 107, for example, a Southbridge chip, receives user input from one or more user input devices such as keyboard 108 or mouse 109 and forwards the input to the CPU 102 via the memory bridge 105. In alternative embodiments, the I/O bridge 107 may also be connected to other input devices such as a joystick, digitizer tablets, touch pads, touch screens, still or video cameras, motion sensors, and/or microphones.

One or more display processors, such as a display processor 112, are coupled to the memory bridge 105 via a bus or other communication path 113 (e.g., a PCI Express, Accelerated Graphics Port, or HyperTransport link). In one embodiment, display processor 112 is a graphics subsystem that includes at least one graphics processing unit (GPU) and a graphics memory. The graphics memory includes a display memory such as a frame buffer that used for storing pixel data for each pixel of an output image. Graphics memory can be integrated in the same device as the GPU, connected as a separate device with the GPU, and/or implemented within the system memory 104.

The CPU 102 provides the display processor 112 with data and/or instructions defining the desired output images, from which the display processor 112 generates the pixel data of one or more output images, including characterizing and/or adjusting the offset between stereo image pairs. The data and/or instructions defining the desired output images can be stored in the system memory 104 or a graphics memory within the display processor 112. The display processor 112 includes 3D rendering capabilities for generating pixel data for output images from instructions and data defining the geometry, lighting shading, texturing, motion, and/or camera parameters for a scene. The display processor 112 further includes one or more programmable execution units capable of executing shader programs, tone mapping programs, and the like.

Alternatively, pixel data can be provided to the display processor 112 directly from the CPU 102. In some embodiments, instructions and/or data representing a scene are provided to a render farm or a set of server computers, each similar to the system 100, via the network adapter 118 or the system disk 114. The render farm generates one or more rendered images of the scene using the provided instructions and/or data. These rendered images may be stored on computer-readable media in a digital format and optionally returned to the system 100 for display. Similarly, stereo image pairs processed by the display processor 112 may be output to other systems for display, stored in the system disk 114, or stored on computer-readable media in a digital format.

Display processor 112 periodically delivers pixels to a multi-touch display 111. The display processor 112 can provide the multi-touch display 111 with an analog or digital signal. The multi-touch display 111 comprises a multi-touch display device such as a conventional CRT or LED monitor with an integrated sensor that detects the location of user contact with the display area of the monitor. The multi-touch display 111 provides gesture recognition input to display processor 112 or CPU 102.

A system disk 114 is also connected to the I/O bridge 107 and is configured to store applications and data for use by the CPU 102 and the display processor 112. The system disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between the I/O bridge 107 and other components such as a network adapter 118 and various add-in cards 120 and 121. The network adapter 118 allows the system 100 to communicate with other systems via an electronic communications network, and facilitates wired and wireless communication over local area networks and wide area networks such as the Internet.

Other components (not shown), including USB or other port connections, film recording devices, and the like, may also be connected to the I/O bridge 107. For example, an audio processor may be used to generate analog or digital audio output from instructions and/or data provided by the CPU 102, the system memory 104, or the system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols.

In another embodiment, the display processor 112 incorporates circuitry optimized for graphics and video processing, including, for example, video output circuitry, and constitutes a graphics processing unit (GPU). In yet another embodiment, the display processor 112 incorporates circuitry optimized for general purpose processing. In another embodiment, the display processor 112 may be integrated with one or more other system elements, such as the memory bridge 105, the CPU 102, and the I/O bridge 107 to form a system on chip (SoC). In still further embodiments, the display processor 112 may be omitted and software executed by the CPU 102 may perform the functions of the display processor 112.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Figure 2:
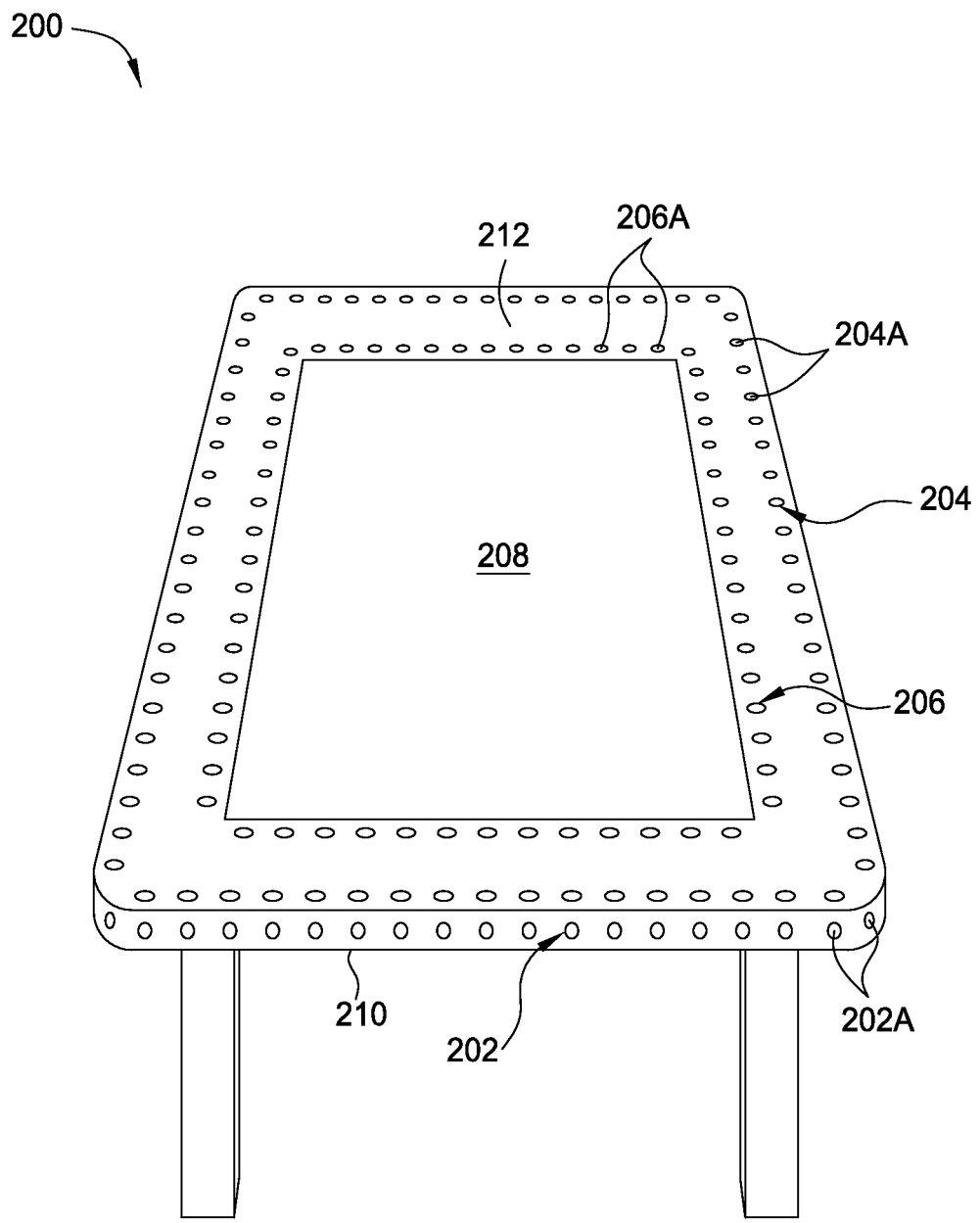
FIG. 2 is a schematic illustration of a proximity-aware multi-touch tabletop according to one embodiment of the invention.

FIG. 2 is a schematic illustration of a proximity-aware multi-touch tabletop 200, according to one embodiment of the invention. The proximity-aware multi-touch tabletop 200 may include any and all components of the system 100. The proximity-aware multi-touch tabletop 200, as shown in FIG. 2, includes an outer ring of sensors 202, a first ring of vertically-directed ring of sensors 204, and a second vertically-directed-ring of sensors 206, where each ring is disposed around the perimeter of a multi-touch display 208. The multi-touch display 208 is similar to the multi-touch display 111, and is adapted to display graphical images as well as receive touch-based inputs from a user.

The outer ring of sensors 202 includes long-range infrared-based sensors positioned along the vertical edge 210 of the proximity-aware multi-touch tabletop 200. The sensors 202A included within the outer ring of sensors 202 are oriented in an outward direction relative to the proximity-aware multi-touch tabletop 200 parallel to an upper surface of the multi-touch display 208. The outer ring of sensors 202 is adapted to detect the presence of a user and the distance of the user from the proximity-aware multi-touch tabletop 200, as well as the position of a user around the multi-touch display 208. The sensors 202A of the outer ring of sensors 202 are continuously sensing while the proximity-aware multi-touch tabletop 200 is powered on. Thus, the proximity-aware multi-touch tabletop 200 is capable of detecting the presence of a user without any more action by a user other than approaching the proximity-aware multi-touch tabletop 200. The sensors 202A of the outer ring of sensors 202 are substantially coplanar with the vertical edge 210, and therefore, the distance between a user and the vertical edge 210 can be easily determined. However, even when the sensors 202A of the vertical ring of sensors 202 are not coplanar with the vertical edge 210, the offset distance is generally known, and therefore, the offset distance can be accounted for when determining user distance from the multi-touch tabletop 200. Thus, the distance of a user from the multi-touch tabletop 200 can be accurately determined.

The first ring of vertically-directed sensors 204 includes long range sensors that are positioned at the outer perimeter of the upper surface 212 of the proximity-aware multi-touch tabletop 200. The second ring of vertically-directed sensors 206 includes short range sensors disposed radially inward of the first ring of vertically-directed sensors 204. As described herein, long range sensors generally have a range of about 10 centimeters (cm) to about 80 cm. Short range sensors generally have a range of about 4 cm to about 30 cm. The combination of long- and short-range sensors allows movements of a user to be detected at a distance from the proximity-aware multi-touch tabletop 200 while also enabling accurate detection of user gestures. Thus, user presence around the proximity-aware multi-touch tabletop 200 can be detected sooner while still facilitating more precise user gestures. The first ring of vertically-directed sensors 204 and the second ring of vertically-directed sensors 206 are generally powered down until a user presence is detected by the outer ring of sensors 202. Thus, power consumption by the proximity-aware multi-touch tabletop 200 is reduced when a user is not within the sensing range of the outer ring of sensors 202.

The second ring of vertically-directed sensors 206 is positioned between the first ring of vertically-directed sensors 204 and the multi-touch display 208. The sensors 202A, 204A, and 206A of each ring of sensors are sampled at about 63 Hz. The sensors 202A for the outer ring of sensors 202 are filtered using a window size of about 17, while the sensors 204A, 206A of the first vertically-directed ring of sensors 204 and the second vertically-directed ring of sensors 206 are filtered using a window size of about 11. Different window sizes are utilized in order to provide a steady body position (which is determined by the outer ring of sensors 202) as well as to increase responsiveness to arm movements (which are detected using the first vertically-directed ring of sensors 204 and the second vertically-directed ring of sensors 206).

The first ring of vertically-directed sensors 204 and the second ring of vertically-directed sensors 206 are generally co-planar with the surface 212. When the first vertically-directed ring of sensors 204 and the second vertically-directed ring of sensors 206 are not coplanar with the surface 212, the offset distance therebetween is known and can be compensated for, thereby facilitating accurate distance measurements using the sensors 204A and 206A. Furthermore, because the outer ring of sensors 202, the first ring of vertically-directed sensors 204 and the second ring of vertically-directed sensors 206 are generally co-planar with the surfaces of the multi-touch tabletop 200, the multi-touch system 200 has a less-cumbersome hardware design. The more simplistic hardware design provides a better user experience, particularly as users move around the multi-touch tabletop 200, by reducing clutter which may otherwise impede the movements of a user.

In one embodiment, the outer ring of sensors includes about 34 long-range sensors spaced about 3.3 cm apart. The first ring of vertically-directed sensors includes about forty-six long-range sensors spaced about 3.3 cm apart, while the second ring of vertically-directed sensors includes about fifty-eight short-range sensors spaced about 0.8 cm. It is contemplated, however, that more or less sensors may be utilized, and further, that the spacing between the sensors may be varied as desired. For example, it is contemplated that additional sensors may be utilized to increase sensing accuracy, or that fewer sensors may be utilized in order to decrease power consumption.

Figure 3:
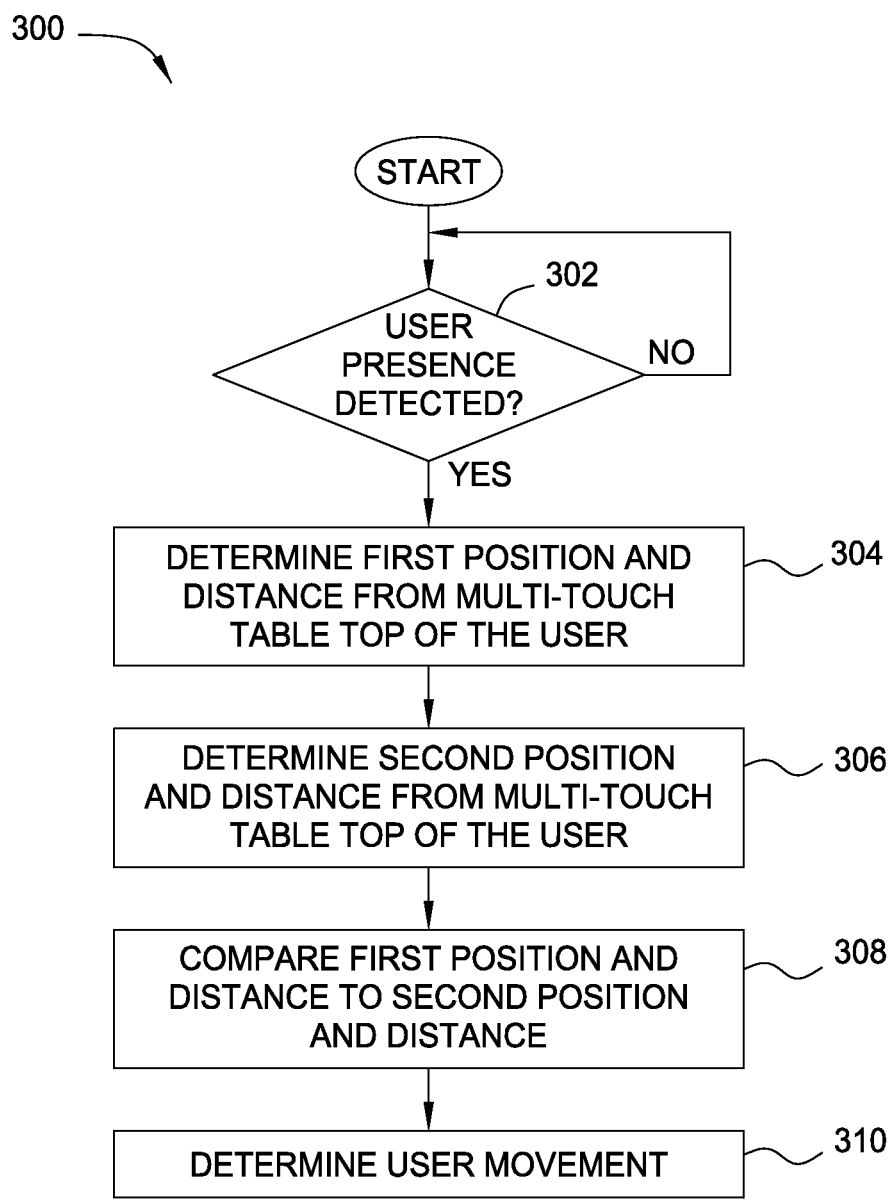
FIG. 3 is a flow diagram of method steps for tracking body movements relative the multi-touch tabletop of FIG. 2, according to one embodiment of the invention.

FIG. 3 is a flow diagram of method steps for tracking body movements relative the multi-touch tabletop of FIG. 2, according to one embodiment of the invention. Although the method steps are described in conjunction with FIGS. 1 and 2, one skilled in the art will understand that any system configured to perform the method steps, in any order, falls within the scope of the present invention.

As shown, the method 300 begins at step 302. At step 302, a multi-touch tabletop management application 151 executing on a system, such as multi-touch tabletop 200 shown in FIG. 2, determines if a user is present. A user presence is detected using an outer ring of sensors. When a user is within the sensing range of the outer ring of sensors 202, for example about 80 cm, a signal from the outer ring of sensors 202 is received by the multi-touch tabletop management application 151 indicating the presence of a user. In step 302, if a user is not present, the multi-touch tabletop management application 151 returns to the beginning of the method 300 and repeats step 302. If a user presence is detected, the multi-touch tabletop management application 151 proceeds to step 304.

In step 304, a first position of the user and a distance of the user from the multi-touch tabletop 200 are determined using the outer ring of sensors 202. Adjacent sensors that detect a user presence are grouped into "sensor chains." The sensor values indicating position and distance of the user are received by the multi-touch tabletop management application 151, and a Gaussian-weighted average for the sensor chain is determined by the multi-touch tabletop management application 151. The Gaussian-weighted average provides an estimate of a body position for the user around the multi-touch tabletop 200.

Subsequent to step 304, a second position of the user and a distance of the user from the multi-touch tabletop 200 are determined in step 306. The second position and distance of the user are determined similar to the first position and distance of the user discussed with respect to step 304. The second position of a user and the second distance of the user from the multi-touch tabletop 200 may are determined after a predetermined amount of time. In one embodiment, the predetermined amount of time may be determined by the sampling rate of the sensors.

In step 308, the multi-touch tabletop management application 151 compares the first position of the user and the first distance of the user from the sensors to the second position of the user and the second distance of the user from the sensors. In step 310, the multi-touch tabletop management application 151 determines whether the user has moved based on the comparison performed in step 308. Thus, the multi-touch tabletop management application 151 is capable of determining user movement and tracking user position around a multi-touch tabletop 200, such as that illustrated in FIG. 2.

FIG. 3 illustrates one embodiment of a method for tracking body movement; however, additional embodiments are also contemplated. For example, in another embodiment, sensor chains of two or less sensors may be omitted in step 306 in order to exclude the erroneous detection of a user presence, since the body of a user generally spans more than two sensors. In another embodiment, additional filtering may be applied to smooth body positions. In yet another embodiment, the movement of more than one user may be determined simultaneously. In step 304, if two or more sensor chains are detected at a predetermined distance from one another, for example, about 50 cm, then the multi-touch tabletop management application 151 considers each sensor chain to be a separate user. In such an embodiment, steps 304-310 are performed for each identified user. Furthermore, when comparing first and second positions and distances in step 308 when multiple users are present, the second user position and distances are mapped to the closest first user position and distances for purposes of determining user movement. Thus, the multi-touch tabletop management application 151 can determine user movement and track user position for multiple users simultaneously.

Figure 4A:
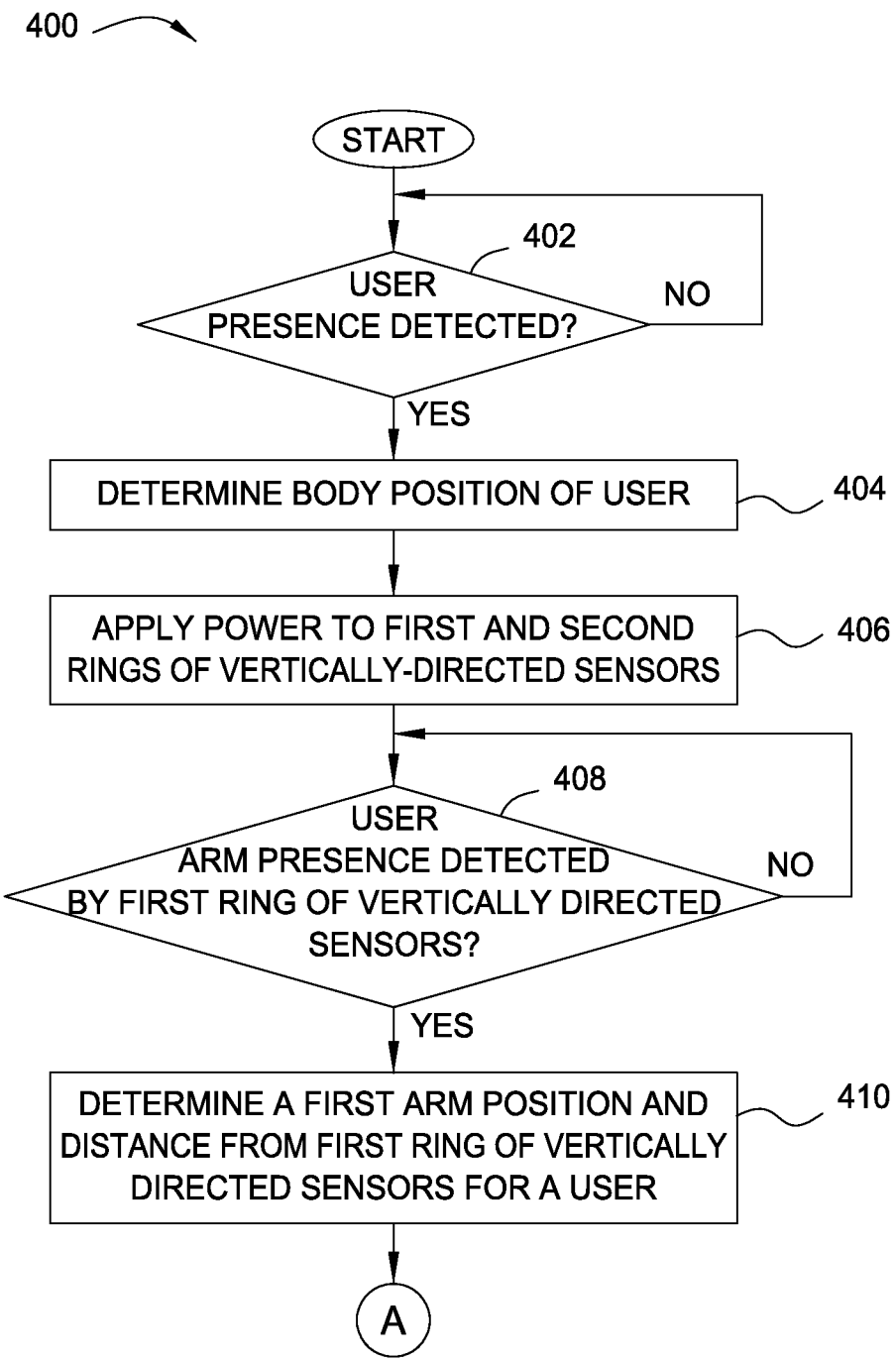
FIGS. 4A-4B set forth a flow diagram of method steps for tracking arm movements relative the multi-touch tabletop of FIG. 2, according to one embodiment of the invention.
Figure 4B:
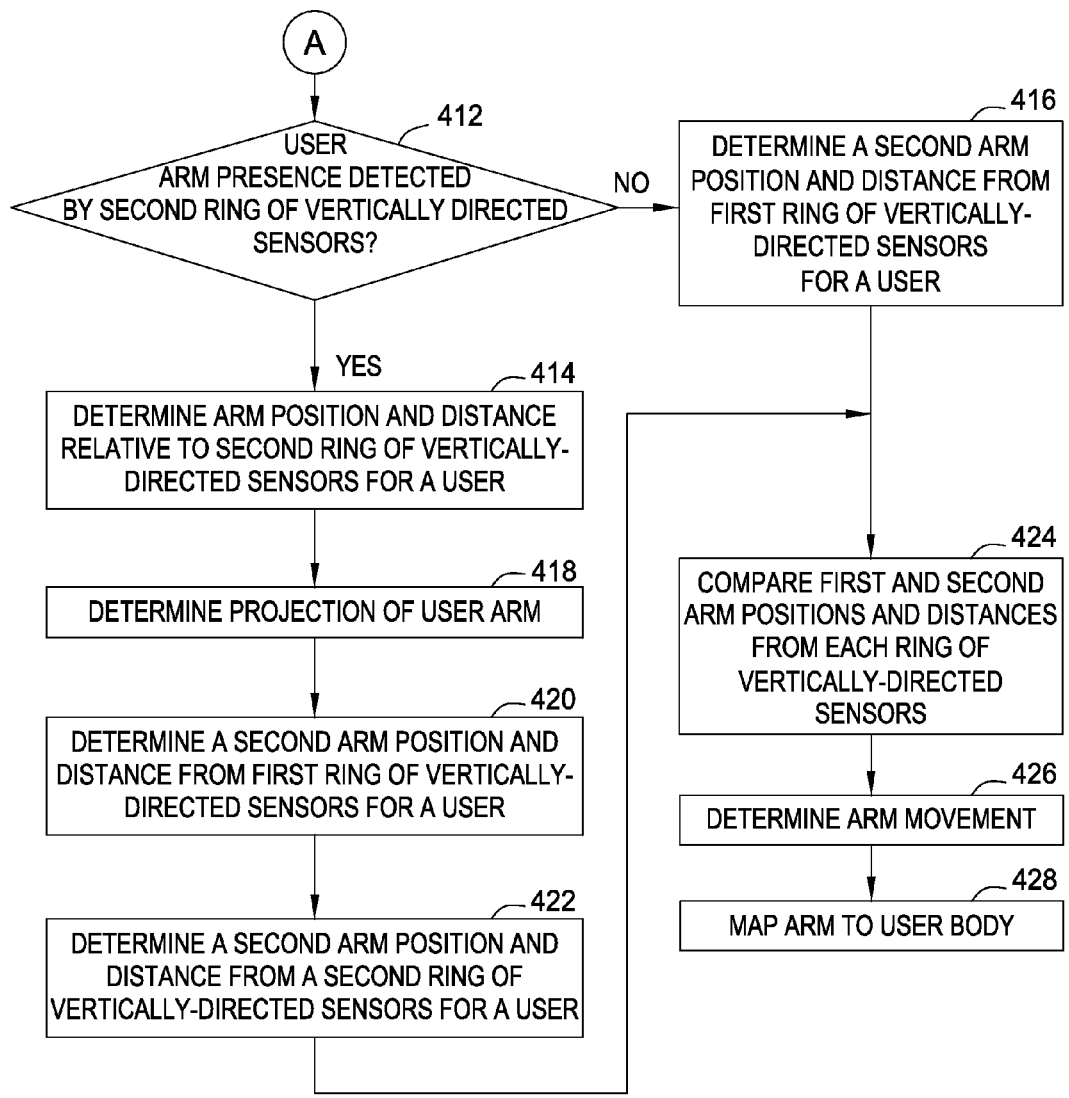

FIGS. 4A-4B set forth a flow diagram of method steps for tracking arm movements relative the multi-touch tabletop of FIG. 2, according to one embodiment of the invention. Although the method steps are described in conjunction with FIGS. 1 and 2, one skilled in the art will understand that any system configured to perform the method steps, in any order, falls within the scope of the present invention.

As shown, the method 400 begins at step 402. In step 402, a multi-touch tabletop management application 151 makes a determination as to whether a user is present by sensing user presence with an outer ring of sensors 202, as described with respect to step 302 shown in FIG. 3. In step 404, a body position of a user is determined, as described with respect to step 304 shown in FIG. 3. In step 406, power is applied to a first ring of vertically-directed sensors 204 and a second ring of vertically-directed sensors 206 in response to the detection of a user. Thus, the first ring of vertically-directed sensors 204 and the second ring of vertically-directed sensors 206 are generally powered off until the presence of a user is detected by the outer ring of sensors 202, thereby reducing the power consumption of the multi-touch tabletop 200 while the multi-touch tabletop 200 is idle.

After the first and second rings of vertically-directed sensors 204, 206 have been powered on, the multi-touch tabletop management application 151 makes a determination as to whether the presence of a user's arm is detected by the first ring of vertically-directed sensors 204. The determination is based on signals received by the multi-touch tabletop management application 151 from the first ring of vertically-directed sensors 204. If the first ring of vertically-directed sensors 204 does not detect the presence of a user, the multi-touch tabletop management application 151 repeats step 408. If the first ring of vertically-directed sensors 204 detects the arm of a user, the multi-touch tabletop management application 151 proceeds to step 410. In step 410, the position of the arm and the distance of the arm from the multi-touch tabletop 200 are determined. When determining the position of the arm and the distance using the first ring of vertically-directed sensors 204, the multi-touch tabletop management application 151 groups consecutive sensors that are currently detecting the arm into "sensor chains". The multi-touch tabletop management application 151 then determines a Gaussian-weighted average of the position and distance values of the sensors. Thus, the multi-touch tabletop management application 151 is capable of determining at what position around the multi-touch tabletop 200 the arm is located, as well as the distance of the arm from the multi-touch tabletop 200.

After determining the arm position and distance from the multi-touch tabletop 200, the multi-touch tabletop management application 151 proceeds to step 412 and makes a determination as to whether a second ring of vertically-directed sensors 206 detects the presence of an arm. If the second ring of vertically directed sensors 206 does not detect an arm, the multi-touch tabletop management application 151 proceeds to step 416 and makes a second determination of the arm position and arm distance from the multi-touch tabletop 200 using the first ring of vertically-directed sensors 204. Because the second determination in step 416 occurs subsequent to the first determination in step 410, the results in step 416 generally differ from step 410, which indicates arm movement as is discussed with respect to step 424.

If the multi-touch tabletop management application 151 determines that the second ring of vertically-directed sensors 206 does detect an arm, the multi-touch tabletop management application 151 proceeds to step 414 and determines the position of the arm and distance of the arm relative to the multi-touch tabletop 200. The position of the arm and distance of the arm from the multi-touch tabletop 200 are determined similarly to the position of the arm and distance of the arm from the multi-touch tabletop 200 described with respect to step 410.

In step 416, the projection of the arm is determined. The projection of the arm is a vector representing a linear approximation of the arm. The position of the arm and the distance of the arm relative to the multi-touch tabletop 200 as determined by the first ring of vertically-directed sensors 204 represent a first point of the linear approximation. The position of the arm and the distance of the arm to the multi-touch tabletop 200 as determined by the second ring of vertically-directed sensors 206 represent a second point of the linear approximation. Utilizing these two points, the multi-touch tabletop management application 151 generates a vector that corresponds to the approximate position of an arm of a user. The determination of arm projection is useful for mapping touch points on a multi-touch display 208 to a particular user.

In step 420, after a predetermined amount of time, a second determination of arm position and arm distance from the multi-touch tabletop 200 using the first ring of vertically-directed sensors is made. Additionally, in step 422, a second determination of arm position and arm distance from the multi-touch tabletop 200 using the second ring of vertically-directed sensors is made. The second determination of arm position and relative arm distance are made similarly to the first determinations of arm position and relative arm distance discussed with respect to steps 410 and 414. Subsequently, in step 424, a comparison is made between the first and second determinations of arm position and relative arm distance for each of the first and second rings of vertically-directed sensors 204, 206. The comparison between the first and second determinations of arm position and relative arm distance facilitate the determination of arm movement in step 426. Because arm movement can be determined, including both arm direction in the X-Y-Z planes as well as the speed of the arm movement, movement-based gestures which do not require contact with a touch display can be utilized to interact with the multi-touch tabletop 200. In step 424, if an arm position determined in steps 420 and 422 is more than a predetermined distance (e.g., 20 cm) from an arm position determined in steps 410 and 414, then the multi-touch tabletop management application 151 considers the measurements to belong to two separate arms. This may occur, for example, if a second user begins to interact with the multi-touch tabletop 200.

In step 428, arms detected by the first and second rings of vertically-directed sensors 204, 206 are mapped to the user body detected in step 402. Using the body position determined in step 404 and the arm positions determined in steps 410, 414, 416, 420, and/or 422, the multi-touch tabletop management application 151 correlates an arm position to the closest body position. It is contemplated that the arm projection determined in step 418 may also be utilized to map an arm to a particular user body. Furthermore, because the body position of the user and the arm position of the user have been previously determined, the multi-touch tabletop management application 151 is capable of determining whether the arm position is located to the left or to the right of the user body. Arm positions located to the left of the user body are designated by the multi-touch tabletop management application 151 to be the left arm of the user, while arm positions located to the right of the user are designated to be the right arm of the user. Because arms can be mapped to a particular user, and because the multi-touch tabletop management application 151 can differentiate between left arm movements and right arm movements, the multi-touch tabletop management application 151 is capable of differentiating commands initiated by different users, and further, capable of differentiating commands initiated by particular arms of a user. Thus, user experience, particularly in a multi-user experience, is greatly enhanced.

FIGS. 4A and 4B illustrate one embodiment of a method 400 for tracking arm movement; however, other embodiments are also contemplated. For example, in one embodiment, it is contemplated that step 428 may be performed after any of steps 410, 414, 416, 420, and/or 422. In another embodiment, it is contemplated that only sensors within the first and second rings of vertically-directed sensors 204, 206 along a side adjacent to a user body determined in step 404 are processed. For example, if a user body is detected along a first side of a multi-touch tabletop 200 in step 404, then, in step 410, 414, 420, and 422, the multi-touch tabletop management application 151 only processes sensors adjacent the first side of the multi-touch tabletop 200. In such an embodiment, significant processing power is saved by reducing the number of sensors analyzed, and the speed at which arm position is determined is increased.

Figure 5:
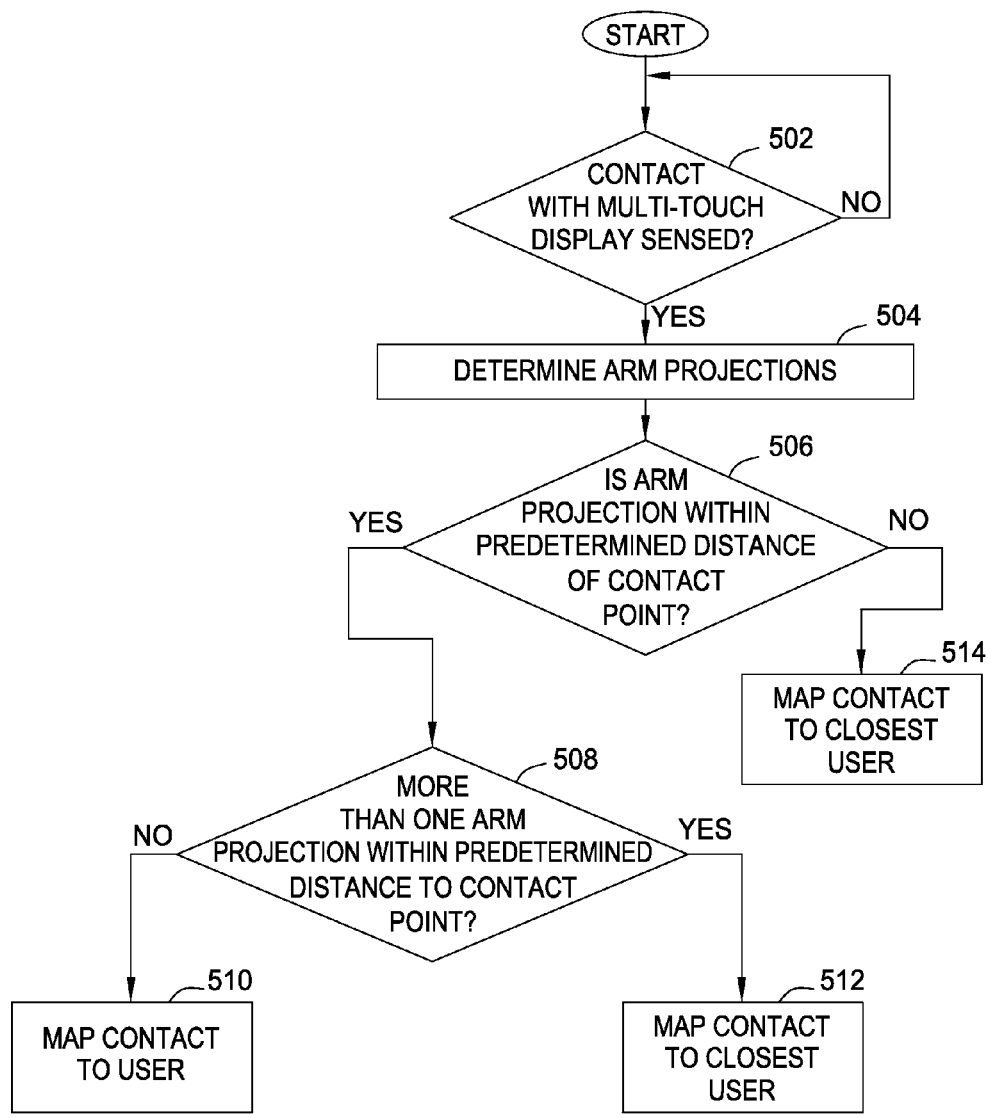
FIG. 5 is a flow diagram of method steps for mapping contact points on a touch screen to user hands, according to one embodiment of the invention.

FIG. 5 is a flow diagram of method steps for mapping contact points on a touch screen to user hands, according to one embodiment of the invention. Although the method steps are described in conjunction with FIGS. 1 and 2, one skilled in the art will understand that any system configured to perform the method steps, in any order, falls within the scope of the present invention.

As shown, the method 500 begins at step 502 in which a multi-touch tabletop management application 151 makes a determination as to whether contact has been made with a multi-touch display 208. If contact has not been made, the multi-touch tabletop management application 151 repeats step 502. If the multi-touch tabletop management application 151 has determined that contact with the multi-touch display 208 has been made, the multi-touch tabletop management application 151 proceeds to step 504. In step 504, the multi-touch tabletop management application 151 determines the arm projections of any arms sensed by the first and second rings of vertically-directed sensors 204 and 206, as is explained in step 418 shown in FIGS. 4A-4B. The contact can be mapped to a particular user using the arm projection. After determining the arm projections of any arms sensed by the first and second rings of vertically-directed sensors 204 and 206, the multi-touch tabletop management application 151 proceeds to step 506.

In step 506, the multi-touch tabletop management application 151 determines whether any of the arm projections are within a predetermined distance of the contact point on the multi-touch display 208. For purposes of determining whether any of the arm projections are within a predetermined distance of the contact point, the multi-touch tabletop management application 151 extrapolates the arm projection to the surface of the multi-touch display 208. If none of the arm projections extend to within the predetermined distance, then the multi-touch tabletop management application 151 proceeds to step 514 and the multi-touch tabletop management application 151 maps the contact point to the closest user body. The position of the closest user body is determined as described in step 304 shown in FIG. 3.

If an arm projection is within the predetermined distance, the multi-touch tabletop management application 151 proceeds to step 508. In step 508, the multi-touch tabletop management application 151 determines if more than one arm projection is within the predetermined distance. If only a single arm projection is within the predetermined distance, then the multi-touch tabletop management application 151 proceeds to step 510, and maps the arm projection to the contact point. If more than one arm projection is within the predetermined distance to the contact point, the multi-touch tabletop management application 151 proceeds to step 512 and maps to the contact point to the arm projection that is closest thereto.

FIG. 5 illustrates one embodiment of a method 500 for mapping contact points to a user; however, other embodiments are also contemplated. For example, in another embodiment, it is contemplated that steps 506-512 may be excluded. Instead, the multi-touch tabletop management application 151 may proceed to step 514, and map the closest arm projection of a user to the contact point.

Figure 6A:
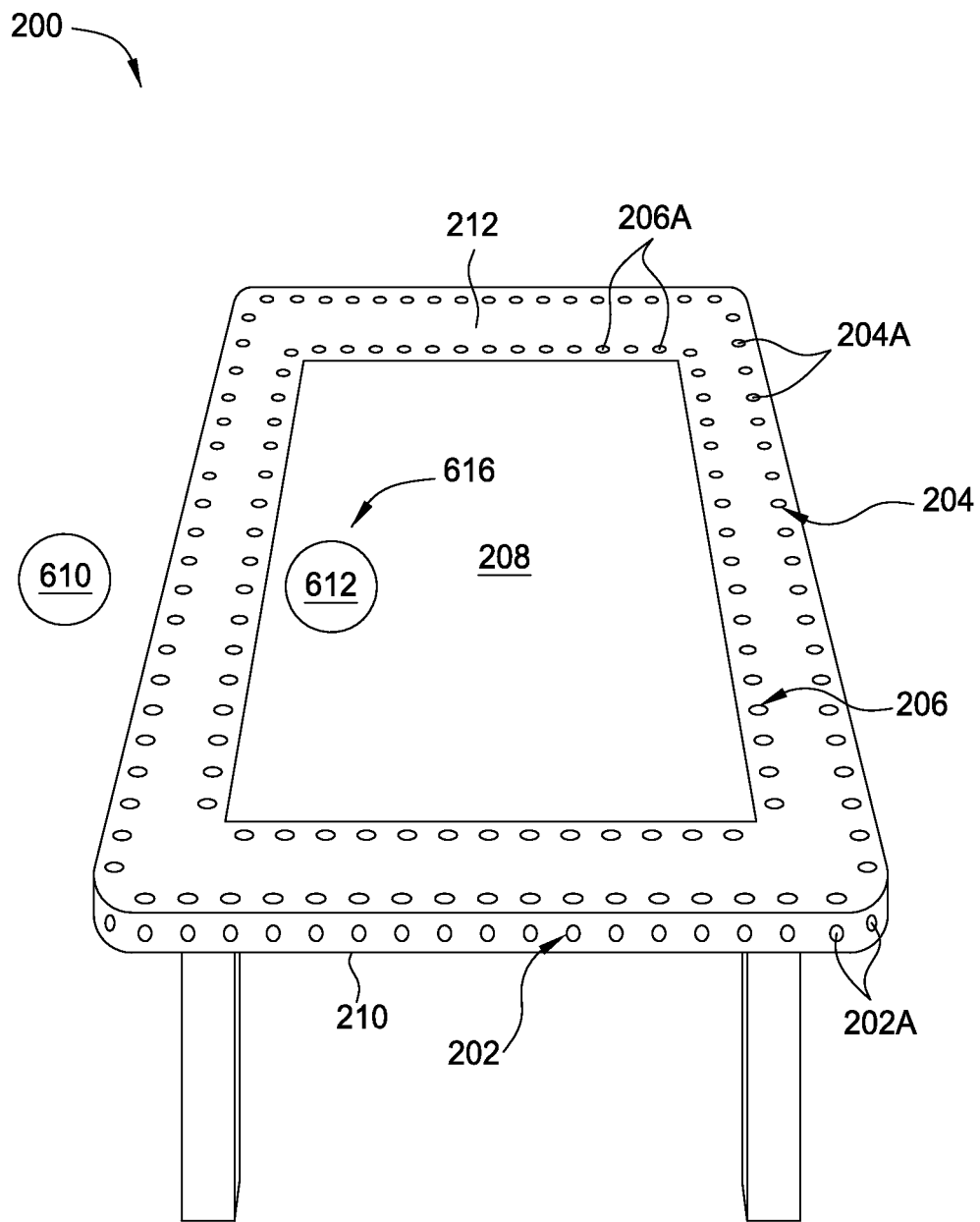
FIG. 6A is a schematic illustration of multi-touch tabletop recognizing the presence of a user, according to one embodiment of the invention.

FIG. 6A is a schematic illustration of multi-touch tabletop recognizing the presence of a user, according to one embodiment of the invention. As the user 610 approaches the multi-touch tabletop 200, the sensors of the outer ring of sensor 206 detect the user's presence, and, in response, a multi-touch tabletop management application 151 displays a graphical representation 616 adjacent to the user 610 on the multi-touch display 208. As the user moves around the perimeter of the multi-touch tabletop, the graphical representation 616 tracks the movement of the user based on signals received from the outer ring of sensors 206, and the graphical representation 616 correspondingly moves to reflect the movement of the user 610.

As illustrated in FIG. 6A, the graphical representation includes an orb 612; however, other graphical representations are contemplated. If more than one user 610 approaches the multi-touch tabletop 200 simultaneously, the multi-touch tabletop 200 may present a graphical representation 616 adjacent to each of the users 610. The user 610 may interact with the graphical representation to log into a particular user account on the multi-touch tabletop 200, for example, using touch-based gestures. After a user logs into a user account, the graphical representation 616 will remain displayed to confirm that the multi-touch tabletop continues to recognize the presence of the user. It is contemplated that a visual change to the graphical representation 616 may occur to illustrate that the user is logged in to an account. In one embodiment, a user can contact the multi-touch display adjacent to the graphical representation 616, and, in response, the multi-touch tabletop management application 151 displays a plurality of user profile pictures representing user accounts. The user may select a desired account, and in response, the multi-touch tabletop management application 151 changes the graphical representation 616 to a customized color determined by the user account to display that the user is logged in.

In some embodiments, the graphical representation 616 may be displayed in varying degrees of transparency or focus in response to the decreasing distance of the user 610 from the multi-touch tabletop 200. For example, as the user 610 is first detected by the outer ring of sensors 206, the graphical representation 616 may be displayed having a fist transparency or focus. As the user 610 approaches closer to the multi-touch tabletop 200, the graphical representation 616 may become decreasingly transparent or increasingly focused until the graphical representation 616 lacks any transparency or is focused. The change in graphical display of the graphical representation 616 in response to an approaching user 610 is useful for inviting the user 610 to interact with the multi-touch tabletop 200, or for informing the user 610 that the multi-touch tabletop 200 is aware of the presence of the user 610. As a user moves away from the multi-touch tabletop 200, the graphical representation 616 becomes more transparent or less focused and then disappears once the user is a predetermined distance from the multi-touch tabletop 200.

Additionally, because the multi-touch tabletop management application 151 is capable of determining when a user 610 is on a specific side of the multi-touch tabletop 200, the multi-touch tabletop management application 151 can support different functionalities when the user 610 is on different sides of the multi-touch tabletop 200. For example, specific modes or tools may be presented to the user 610 or otherwise enabled when the user 610 is on a particular side of the multi-touch tabletop 200. Additionally or alternatively, application content may be presented in a particular style or format when a user 610 is on a particular side of the multi-touch tabletop 200. As the user 610 moves around the multi-touch tabletop 200, the multi-touch tabletop management application 151 can reorient content to the proper orientation based on the detected position of the user 610. In another example, a particular functionality may be provided when a user 610 is positioned at a corner of the multi-touch tabletop 200. For instance, the presence of the user 610 may be recognized and a graphical representation 616 may be displayed when the user is adjacent a corner of the multi-touch tabletop; however, the user 610 may be prohibited from logging in while standing at the corner of the multi-touch tabletop 200.

Figure 6B:
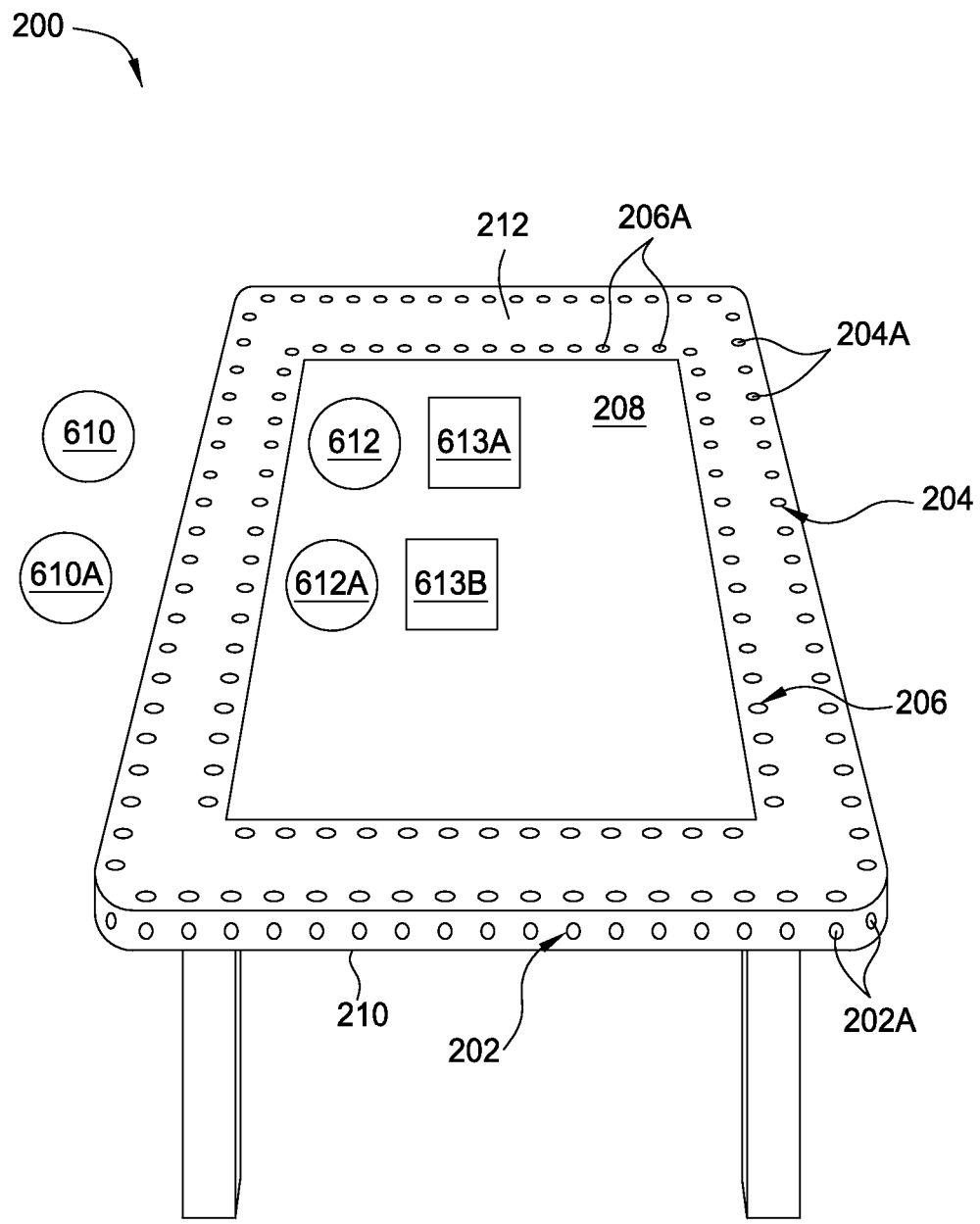
FIG. 6B is a schematic illustration of multi-touch tabletop recognizing the presence of multiple users, according to one embodiment of the invention.

FIG. 6B is a schematic illustration of multi-touch tabletop 200 recognizing multiple users 610 and 610A, according to one embodiment of the invention. As illustrated in FIG. 6B, orbs 612 and 612A which are exemplary graphical representations are displayed in response to the presence of each user 610 and 610A, respectively. The users 610 and 610A may interact with the content 613A and 613B after logging in, as explained above. A user that is not logged in cannot interact with the content 613A or 613B. This allows a casual observer to point to the content 613A and 613B without accidentally changing or otherwise interacting with the content 613A or 613B.

When a user 610 or 610A is interacting with either the content 613A or 613B, the other user is prohibited from interacting with that particular content. More specifically, no user can interact with content with which another user is currently interacting. A user 610 or 610A, however, can only "control" one component of content at time in this manner. Thus, user 610 could control either the content 613A or 613B, thus preventing user 610A from interacting with the content 613A or 613B, but the user 610 could not control both content 613A and 613B simultaneously. For example, if user 610 is interacting with content 613A, and begins interacting with content 613B, user 610 would gain control of content 613B (assuming another user does not already have control of content 613B and thus control can be gained), and would lose control of content 613A. User 610A could then interact with content 613A. If user 610 wishes to relinquish control of content 613A without gaining control of content 613B, user 610 can take a small step away from the multi-touch system 200, and the multi-touch tabletop management application would then allow another user to interact with the content 613B. Content which is under the control of a particular user is designated as such by applying to the content a colored border which corresponds to the color of the user's graphical representation. Thus, the remaining users are made aware that control over the content is already established.

FIGS. 6A-6B illustrate embodiments of a multi-touch tabletop; however, additional embodiments are also contemplated. For example, it is contemplated that proximity may be determines using depth cameras in addition to or as an alternative to the proximity sensors. In such an embodiment, the depth cameras may be mount on the multi-touch tabletop, or may be mounted externally thereto, such as on a ceiling or wall.

Figure 7A:
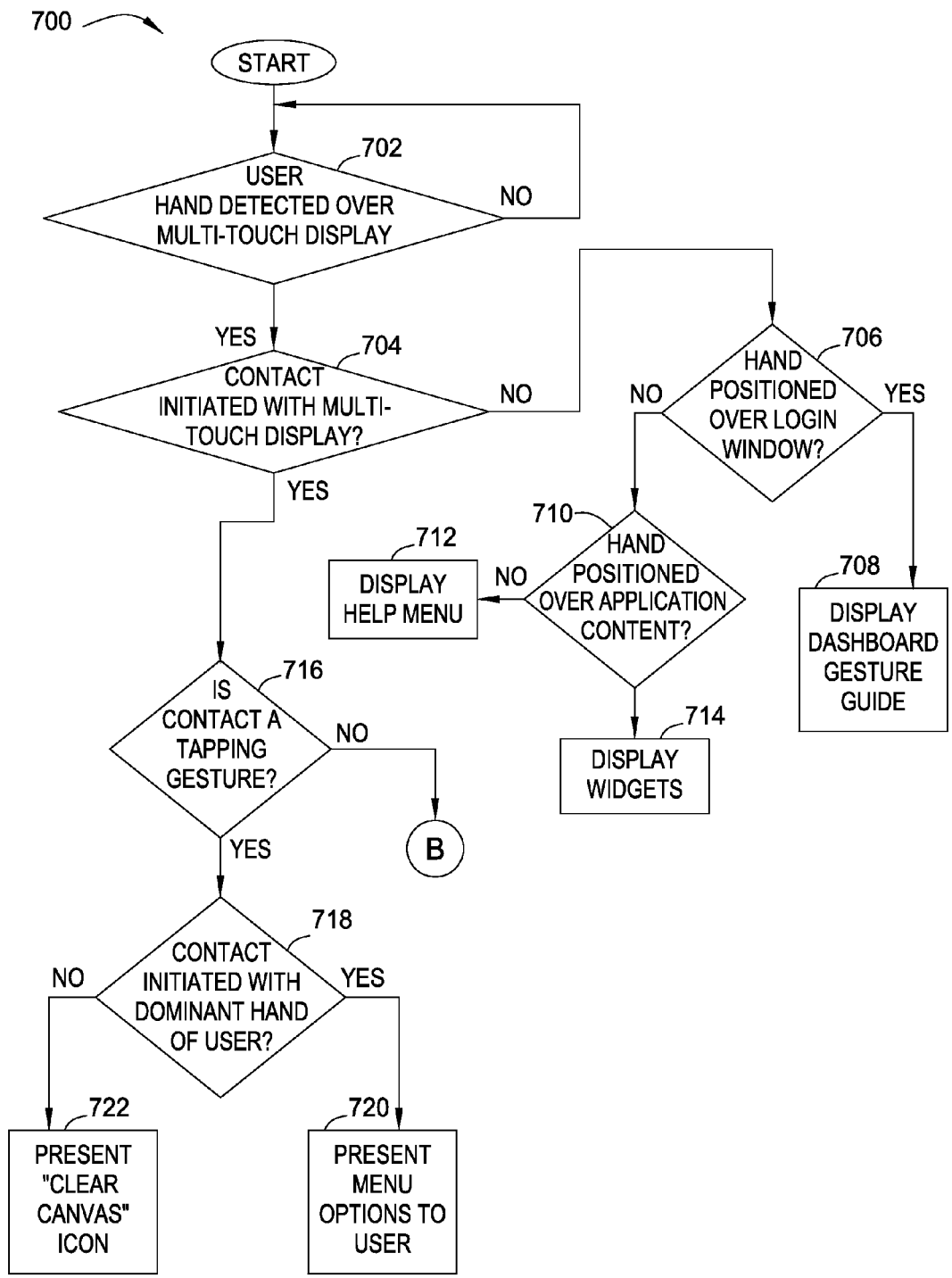
FIGS. 7A-7B set forth a flow diagram of method steps for performing actions in response to user interactions relative the multi-touch tabletop of FIGS. 6A-6B, according to one embodiment of the invention.
Figure 7B:
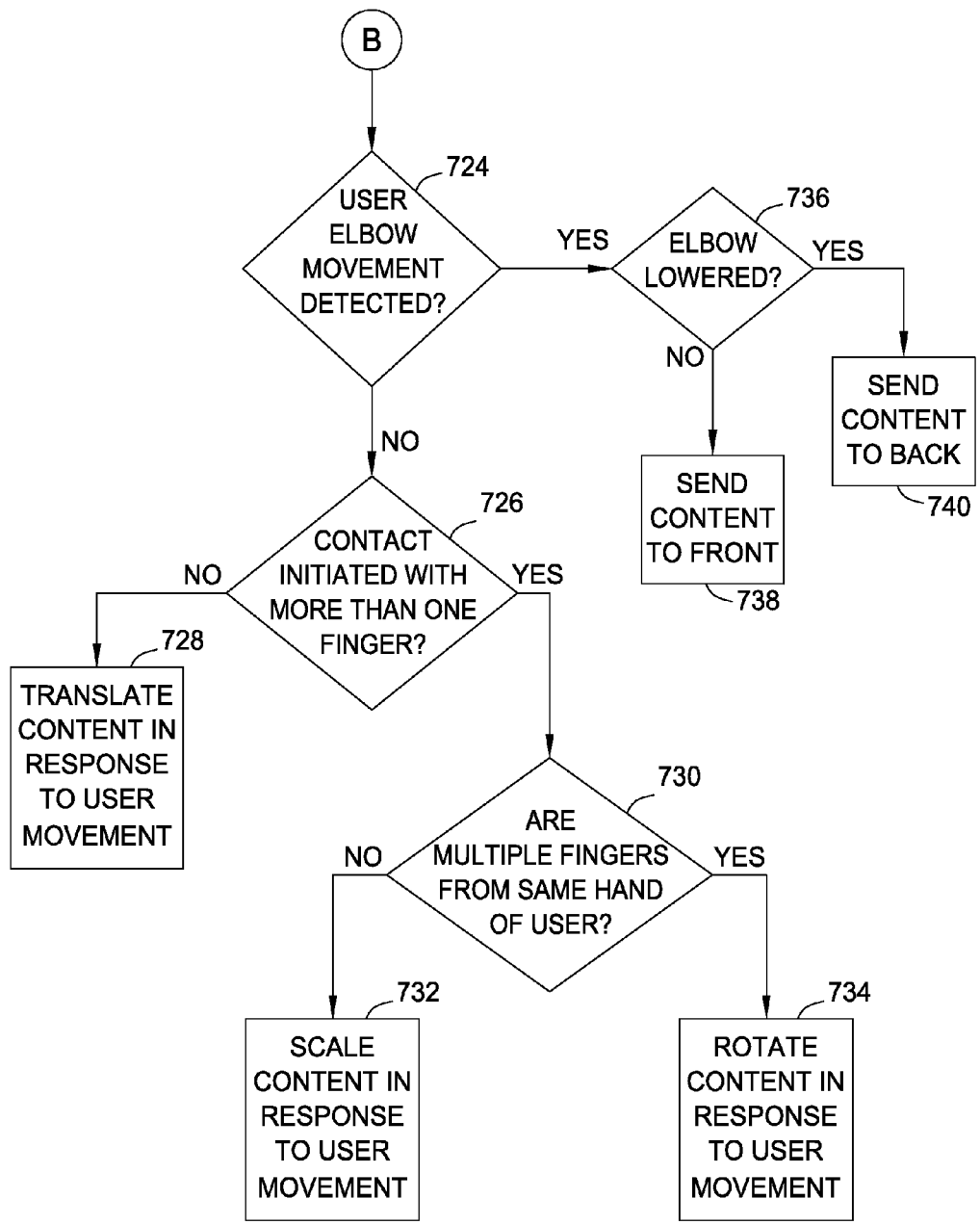

FIGS. 7A-7B set forth a flow diagram of method steps for performing actions in response to user interactions relative the multi-touch tabletop of FIGS. 6A-6B, according to one embodiment of the invention. Although the method steps are described in conjunction with FIGS. 1, 2, 6A, and 6B, one skilled in the art will understand that any system configured to perform the method steps, in any order, falls within the scope of the present invention.

As shown, the method 700 begins at step 702 in which a multi-touch tabletop management application 151 determines whether a hand of a user is positioned over a multi-touch display. The multi-touch tabletop management application 151 determines whether a hand is positioned over the multi-touch display 208 by determining the arm projections of a user as discussed in step 418 of method 400, or by determining that contact has been made with the multi-touch display 208. If the multi-touch tabletop management application 151 determines that a hand is not positioned over the multi-touch display 208, the multi-touch tabletop management application 151 repeats step 702.

If the multi-touch tabletop management application 151 determines that a hand is positioned over the multi-touch display 208, the multi-touch tabletop management application 151 proceeds to step 704. In step 704, the multi-touch tabletop management application 151 determines whether the hand positioned over the multi-touch display 208 is in contact with the multi-touch display 208 based on signals received from one or more sensors embedded within the multi-touch display 208. If the hand positioned over the multi-touch display 208 is not in contact with the multi-touch display 208, the multi-touch tabletop management application 151 proceeds to step 706. In step 706, the multi-touch tabletop management application 151 determines whether the hand is positioned over a graphical representation 616 corresponding to a logged-in user, for example orb 612 shown in FIG. 6A. If the multi-touch tabletop management application 151 determines that the hand is positioned over a graphical representation 616 corresponding to a logged-in user, the multi-touch tabletop management application 151 proceeds to step 708 and displays a dashboard gesture guide. The dashboard gesture guide illustrates various touch and proximity gestures that may be utilized to interact with the system, and may include commands such as "logout", "open" and "save".

If, in step 706, the multi-touch tabletop management application 151 determines that the hand is not positioned over a graphical representation 616 corresponding to a logged-in user, the multi-touch tabletop management application 151 proceeds to step 710 and determines whether the hand is positioned over any application content 613A or 613B, for example, content displayed on the multi-touch display by a software application executing on the multi-touch tabletop. If the hand is positioned over any application content 613A or 613B, the multi-touch tabletop management application 151 proceeds to step 714 and displays widgets associated with the specific application content 613A or 613B over which the hand is positioned. The widgets may include, for example, menu options associated with the application content 613A or 6138, such as options to edit the content. If, in step 710, the multi-touch tabletop management application 151 determines that the hand is not positioned over any application content 613A or 613B, the multi-touch tabletop management application 151 proceeds to step 712 and displays a help menu. It is to be noted that although the multi-touch tabletop management application 151 is described as performing certain actions when a hand is positioned over particular content displayed on the multi-touch display surface, generally, the multi-touch tabletop management application 151 does not perform an action until the hand is positioned over the content 613A or 613B for a predetermined amount of time. Thus, the likelihood of an inadvertent command being initiated by a user is reduced when the user is simply moving his or her hand adjacent to the multi-touch display 208.

Returning to step 704, if the multi-touch tabletop management application 151 determines that contact has been initiated with multi-touch display 208, the multi-touch tabletop management application 151 proceeds to step 716. In step 716, the multi-touch tabletop management application 151 determines whether the contact was a tapping gesture. The multi-touch tabletop management application 151 considers the contact a tapping gesture if the contact was maintained by the user for less than predetermined amount of time, for example, less than about 0.5 seconds. If the multi-touch tabletop management application 151 determines that the contact is a tapping gesture, the multi-touch tabletop management application 151 proceeds to step 718 and determines whether the contact was initiated with the dominant hand of the user. It is contemplated that each user may define his or her dominant hand and save the information to the user's personal account. Each user account can be accessed as illustrated in FIG. 6A. For guest user accounts, the dominant hand may be defaulted to a particular hand, for example, the right hand of the guest user.

If the multi-touch tabletop management application 151 determines that the tapping gesture was initiated by the dominant hand of the user, the multi-touch tabletop management application 151 proceeds to step 720 and displays a predetermined set of menu options on the multi-touch display 208. The menu options may include, for example, content or other software applications which may be opened on the multi-touch tabletop. If, on the other hand, the multi-touch tabletop management application 151 determines that the tapping gesture was initiated by the non-dominant hand of the user, the multi-touch tabletop management application 151 may proceed to step 722 and present a "clear canvas" or "close" option such as an "X", or may simply close the application or content window that has been tapped by the non-dominant hand.

Returning to step 716, if the multi-touch tabletop management application 151 determines that the contact is not a tapping a gesture (e.g., the contact is maintained with the multi-touch display 208 for greater than a predetermined amount of time), then the multi-touch tabletop management application 151 proceeds to step 724. In step 724, the multi-touch tabletop management application 151 determines whether a vertical change in elbow position has occurred. The multi-touch tabletop management application 151 is capable of determining whether a vertical change in elbow position has occurred by comparing successive determinations of arm projections. If the angle of the arm projection relative the surface of the multi-touch tabletop decreases while the user maintains contact with the multi-touch display 208, the multi-touch tabletop management application 151 associates the movement with the elbow being lowered. Conversely, if the angle of the arm projection relative the surface of the multi-touch tabletop 200 increases while the user maintains contact with the multi-touch display 208, the multi-touch tabletop management application 151 associates the movement with the elbow being raised.

If, in step 724, the multi-touch tabletop management application 151 determines that vertical elbow movement has occurred, the multi-touch tabletop management application 151 proceeds to step 736 to determine if the elbow has been raised or lowered. If the elbow has been lowered, the multi-touch tabletop management application 151 proceeds to step 740, and in response to the lowering of the elbow, the multi-touch tabletop management application 151 sends content which is adjacent to the hand of the user to a location behind other displayed content such that the content previously adjacent the user's hand is now occluded. Such a command may be referred to as a "send to back" command. In contrast, if the multi-touch tabletop management application 151 determines in step 736 that the user has raised his or her elbow, then the multi-touch tabletop management application 151 proceeds to step 738, and brings the content that is adjacent to the hand of the user to the foreground of the multi-touch display 208.

Returning to step 724, if the multi-touch tabletop management application 151 determines that no elbow movement has occurred, the multi-touch tabletop management application 151 proceeds to step 726. In step 726, the multi-touch tabletop management application 151 determines whether the user has contacted the multi-touch display 208 using more than one finger. The multi-touch tabletop management application 151 utilizes touch-based sensors embedded in the multi-touch display 208 to determine the number of contact points with the multi-touch display. Contact points within a predetermined distance to an arm projection, as discussed with respect to FIG. 5, are considered by the multi-touch tabletop management application 151 to have originated from the same user.

If the multi-touch tabletop management application 151 determines that contact with the multi-touch display 208 is made with a single finger, the multi-touch tabletop management application 151 proceeds to step 728 and allows the content adjacent the contacting finger to be translated. In step 728, the content is translated in response to movement of the contacting finger. The translation of the content reflects the movement of the finger.

Alternatively, if the multi-touch tabletop management application 151 determines in step 726 that contact with the multi-touch display 208 is made with more than one finger, the multi-touch tabletop management application 151 proceeds to step 730. In step 730, the multi-touch tabletop management application 151 determines whether the multiple fingers in contact with the multi-touch display 208 are from the same hand or from different hands of a user. The multi-touch tabletop management application 151 uses arm projections as described in step 418 (shown in FIGS. 4A-4B) to map the contact points to a user. If the contact points are mapped to the same arm of a user, the multi-touch tabletop management application 151 proceeds to step 734. In step 734, the multi-touch tabletop management application 151 rotates the content adjacent the user's fingers in response to the user performing a rotating motion with his or her hand.

If, in step 730, the multi-touch tabletop management application 151 determines that the fingers in contact with the multi-touch display are from different hands of a user, the multi-touch tabletop management application 151 enables the scaling of content. In step 732, the multi-touch tabletop management application 151 scales the content adjacent to the user's fingers in response to movement of the user's fingers. For example, if the user extends the fingers in contact with the multi-touch display away from one another, the multi-touch tabletop management application 151 enlarges the content. Conversely, if the user decreases the spacing between the fingers in contact with the multi-touch display, the multi-touch tabletop management application 151 decreases the size of the content.

The method 700 illustrates one embodiment of performing actions in response to user interaction; however, other embodiments are also contemplated. For example, it is contemplated that the multi-touch tabletop management application 151 may receive input from several users simultaneously. In such an embodiment, the multi-touch tabletop management application 151 can simultaneously perform actions in response to each user input. Furthermore, because the multi-touch tabletop management application 151 can map contact points and gestures to each user separately, the multi-touch tabletop management application 151 is capable of performing simultaneous touch-based gestures. For example, one user can rotate content while another translates content. Such actions are not possible with standard touch-based devices. In addition, it is contemplated that when multiple users are interacting with the multi-touch tabletop, the multi-touch tabletop management application 151 can orient content towards the user currently interacting with the multi-touch table.

As illustrated by FIGS. 7A-7B, the multi-touch tabletop utilizes a touch-based display and proximity sensors to increase the number of ways through which a user may interact with a multi-touch tabletop 200. The multi-touch tabletop management application 151 is capable of receiving input and performing actions based on a combination of touch and proximity gestures. Therefore, because the multi-touch tabletop 200 is capable of receiving a greater variety of user inputs than standard touch devices, the number of interactions with the multi-touch tabletop 200 is greater and the overall user experience is more enjoyable. It is to be noted, however, that FIGS. 7A-7B are only exemplary of some actions which are performed in response to user interaction. For example, in another embodiment, a user may hover his or her hand over the first ring of vertically-directed sensors 204. In such an embodiment, additional gestures that may be performed by a user are displayed on the multi-touch display 208. The additional gestures may be beneficial for assisting the user in interacting with the multi-touch tabletop 200, particularly when a user is unsure of which gestures are available for interacting with the multi-touch tabletop 200. Thus, as can be seen, in some embodiments a user can interact with a multi-touch tabletop 200 using only proximity-based gestures.

Figure 8:
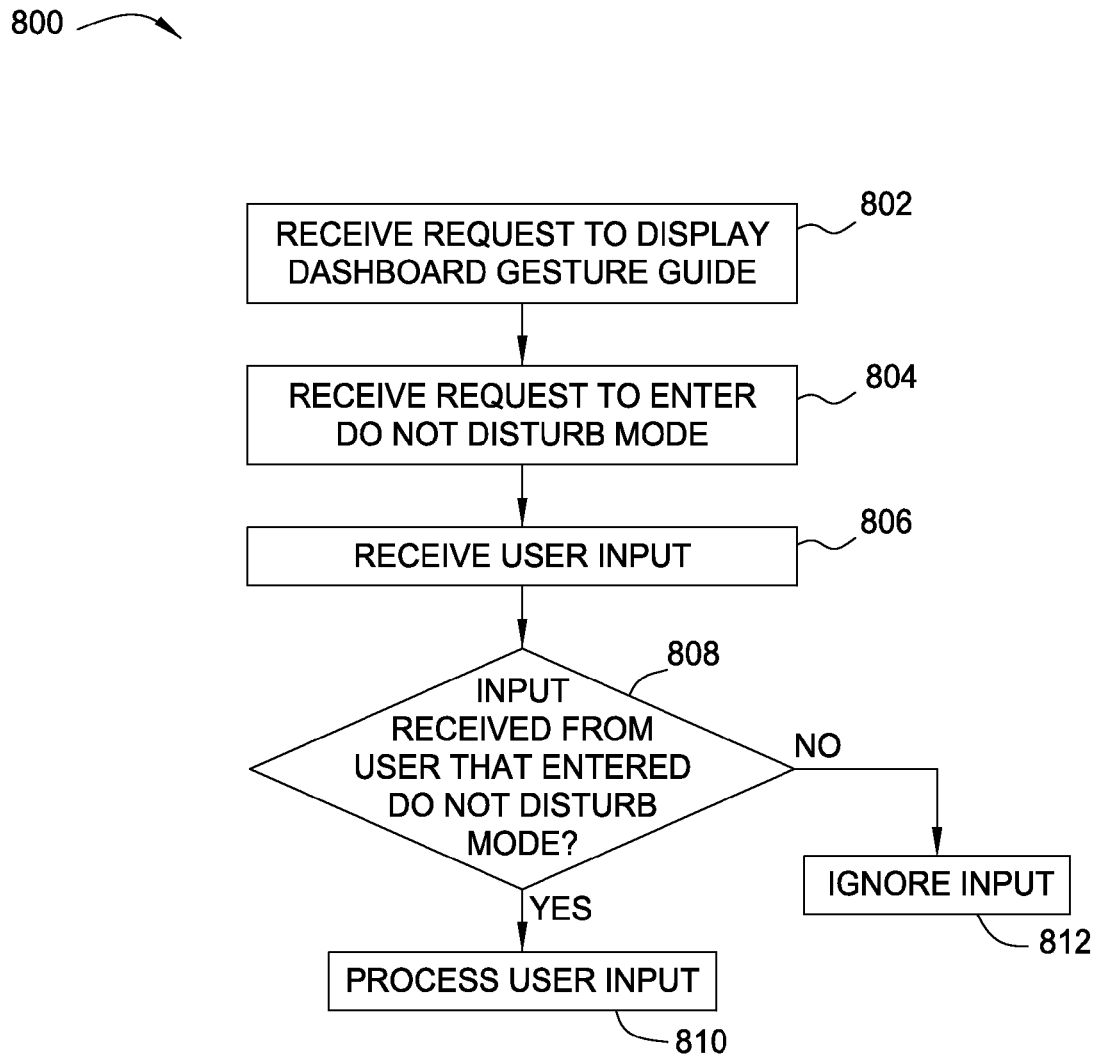
FIG. 8 is a flow diagram of methods steps for processing input to the multi-touch tabletop of FIGS. 6A-6B when operating in a "Do Not Disturb" mode, according to one embodiment of the invention.

FIG. 8 is a flow diagram of methods steps for processing input to the multi-touch tabletop of FIGS. 6A-6B when operating in a "Do Not Disturb" mode, according to one embodiment of the invention. Although the method steps are described in conjunction with FIGS. 1, 2, 6A, and 6B, one skilled in the art will understand that any system configured to perform the method steps, in any order, falls within the scope of the present invention.

As shown, the method 800 begins at step 802. In step 802, a multi-touch tabletop management application 151 receives a request to display a dashboard gesture guide, as explained with reference to step 708 shown in FIGS. 7A-7B. In step 804, the multi-touch tabletop management application 151 receives a request to enter a "Do Not Disturb" mode. The "Do not Disturb" mode is an option on the dashboard gesture guide which is selectable by a user. The "Do not Disturb" mode is mode which allows only a single user (e.g., the user who initiated the command to enter the "Do not Disturb" mode) to interact with the multi-touch tabletop 200. Interaction with the multi-touch tabletop 200 by other users is prohibited, and commands received by the multi-touch tabletop management application 151 from other users are ignored, as illustrated in steps 806-812.

In step 806, the multi-touch tabletop management application 151 receives user input. The user input, for example, may be a touch-based or proximity-based gesture instructing the multi-touch tabletop 200 to perform a specified action. In step 808, the multi-touch tabletop management application 151 makes a determination as to whether the received input is from the user who initiated the "Do not Disturb" mode. In making this determination, the multi-touch tabletop management application 151 maps the received input to a user using arm projections as explained with reference to step 418 of FIGS. 4A-4B. If the input is received from the user who entered the "Do not Disturb" mode, the multi-touch tabletop management application 151 proceeds to step 810 and processes the user input. In the multi-touch tabletop management application 151 determines that the input is received from a user other than the user who entered the "Do not Disturb" mode, the multi-touch tabletop management application 151 ignores the input. Until the "Do not Disturb" mode is exited by the same user who entered the "Do not Disturb" mode, only the user who initiates the "Do not Disturb" mode can interact with the multi-touch tabletop 200.

In some embodiments, the multi-touch tabletop management application 151 may inform users adjacent to the multi-touch tabletop 200 that the system is in a "Do not Disturb" mode. For example, graphical representations displayed on the multi-touch display 208 adjacent to each user may appear differently for the user who is able to interact with the multi-touch display 208. It is contemplated that the user who has permission to interact with the multi-touch display may have a graphical representation displayed in a first color (e.g., blue), while users who do not have permission may have graphical representations displayed in a second color, (e.g., red). Other ways of informing users that the users do not have permission to interact with the multi-touch tabletop 200 are also contemplated.

In sum, a proximity-aware multi-touch tabletop is disclosed that includes both a touch screen display and proximity sensors. The proximity sensors are disposed in one or more annular groups around the touch screen display. In one embodiment, the proximity sensors are infrared-based and are positioned in three groups around the touch screen. In such an embodiment, a first outward ring includes long range sensors to sense the proximity of one or more users near the multi-touch tabletop. Each sensor of the outward ring of sensors is directed outward in a horizontal direction to sense the presence of a user and the distance of the user from the multi-touch tabletop. Once the outer ring of sensors detects the presence of a user, a first vertically-directed ring of sensors and a second vertically-directed ring of sensors are activated. The first vertically-directed ring of sensors is disposed outward of the second vertically-directed ring of sensors. The first vertically-directed ring of sensors and the second vertically-directed ring of sensors are adapted to track and identify arm, hand, and finger movements of a user. The first vertically-directed ring of sensors includes long-range sensors, while the second vertically-directed ring of sensors includes short-range sensors to increase sensing resolution.

The combination of the outward ring of sensors and the first and second vertically-directed rings of sensors allows the multi-touch tabletop to sense the distance of a body, arm, hand, or fingers of a user from the multi-touch tabletop. Thus, hand, arm, and finger positions of a user can be determined relative to the body position of the user, which enables the multi-touch tabletop to differentiate between left hand/arm gestures and right hand/arm gestures using the user body as a reference. Further, because the multi-touch tabletop can correlate left arm and right arm movements to a user body, the multi-touch tabletop is capable supporting multiple users by determining whether a gesture originated form a left hand/arm or a right hand/arm of a particular user. Also, because the multi-touch tabletop can differentiate between commands from different users, the multi-touch tabletop can support different functionalities depending on which user is currently interacting with the multi-touch tabletop. For example, images displayed on the multi-touch tabletop may be oriented in a particular direction depending upon which user is currently interacting with the multi-touch tabletop.

One advantage of the disclosed multi-touch tabletop is that it enables enhanced user experiences, particularly when multiple users are interacting with the multi-touch tabletop in a collaborative manner. Specifically, the disclosed multi-touch tabletop is able to differentiate interactions between particular users and can orient content on a display screen appropriately. Additionally, the disclosed multi-touch tabletop facilities several new modes of interaction, including hand-dependent menus, hand-dependent object transformations, and hand-dependent grouping manipulations. Further interactions include hover-activated gestures, content control through user proximity, and do-not-disturb modes. Because the multi-touch tabletop can track user movements using the proximity sensors, a user can interact with the multi-touch tabletop using gestures that do not require physical contact with a touch screen display. Thus, programs designed for use on the multi-touch tabletop can utilize a wider range of interaction modes and commands which further enhances user experience.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

In view of the foregoing, the scope of embodiments of the present invention is defined by the claims that follow.

What is claimed is:

1. A computer-implemented method of processing user data relative to a multi-touch tabletop, the method comprising:
   receiving a first signal from a first ring of proximity sensors indicating that a first object resides at or within a first distance from the multi-touch tabletop;
   receiving a second signal from a second ring of proximity sensors indicating that a second object resides at or within a second distance from the multi-touch tabletop;
   determining that the first object represents a body of a user and the second object represents a portion of an arm of the user based on the first distance exceeding the second distance; and
   in response, generating an instruction.

2. The computer-implemented method of claim 1, further comprising:
   receiving a third signal from a third ring of proximity sensors indicating that a third object resides at or within a third distance from the multi-touch tabletop; and
   receiving a signal from a touch-based sensor embedded in a multi-touch display.

3. The computer-implemented method of claim 2, wherein:
   each of the first ring of proximity sensors, the second ring of proximity sensors, and the third ring of proximity sensors comprises infrared sensors; and
   generating the instruction further comprises generating the instruction in response to receiving the second signal, the third signal, and the signal from the touch-based sensor embedded in the multi-touch display.

4. The computer-implemented method of claim 2, further comprising:
   determining that the third object represents another portion of the arm of the user;
   generating a linear approximation of the arm of the user based on the second distance and the third distance; and
   determining a position of the arm of the user based on the linear approximation of the arm of the user.

5. The computer-implemented method of claim 4, further comprising:
   comparing a first position associated with a first sensor configured to generate the first signal to a second position associated with a second sensor configured to generate the second signal to determine that the first position resides to a first side of the second position; and
   determining that the arm of the user resides to the first side of the body of the user based on the first position residing to the first side of the second position, wherein the first side comprises a right side or a left side.

6. The computer-implemented method of claim 5, further comprising determining that the user contacted the multi-touch display based on the signal received from the touch-based sensor embedded in the multi-touch display.

7. The computer-implemented method of claim 2, further comprising receiving a fourth signal from the first ring of sensors, and comparing the first signal to the fourth signal to determine movement of a user.

8. The computer-implemented method of claim 7, further comprising:
   receiving a fifth signal from the second ring of sensors;
   receiving a sixth signal from the third ring of sensors;
   comparing the fifth signal to the second signal
   comparing the sixth signal to the third signal; and
   determining movement of an arm of the user based on both the comparison of the fifth signal to the second signal and the comparison of the sixth signal to the third signal.

9. A non-transitory computer-readable medium for storing instructions that, when executed by a processor of a computer system, cause the system to process user data relative to a multi-touch tabletop, by performing the steps of:
  receiving a first signal from a first ring of proximity sensors indicating that a first object resides at or within a first distance from the multi-touch tabletop;
  receiving a second signal from a second ring of proximity sensors indicating that a second object resides at or within a second distance from the multi-touch tabletop;
  determining that the first object represents a body of a user and the second object represents a portion of an arm of the user based on the first distance exceeding the second distance; and
  in response, generating an instruction.

10. The non-transitory computer-readable medium of claim 9, further comprising the steps of:
  receiving a third signal from a third ring of proximity sensors indicating that a third object resides at or within a third distance from the multi-touch tabletop; and
  receiving a signal from a touch-based sensor embedded in a multi-touch display.

11. The non-transitory computer-readable medium of claim 10, wherein:
  each of the first ring of proximity sensors, the second ring of proximity sensors, and the third ring of proximity sensors comprises infrared sensors; and
  generating the instruction further comprises generating the instruction in response to receiving the second signal, the third signal, and the signal from the touch-based sensor embedded in the multi-touch display.

12. The non-transitory computer-readable medium of claim 10, further comprising the step of receiving a fourth signal from the first ring of sensors, and comparing the first signal to the fourth signal to determine movement of a user.

13. The non-transitory computer-readable medium of claim 12, further comprising the steps of:
  receiving a fifth signal from the second ring of sensors;
  receiving a sixth signal from the third ring of sensors;
  comparing the fifth signal to the second signal
  comparing the sixth signal to the third signal; and
  determining movement of an arm of the user based on the comparison of the fifth signal to the second signal and the sixth signal to the third signal.

14. The non-transitory computer-readable medium of claim 9, further comprising the steps of:
  determining that the third object represents another portion of the arm of the user;
  generating a linear approximation of the arm of the user based on the second distance and the third distance; and
  determining a position of the arm of the user based on the linear approximation of the arm of the user.

15. The non-transitory computer-readable medium of claim 14, further comprising the steps of:
  comparing a first position associated with a first sensor configured to generate the first signal to a second position associated with a second sensor configured to generate the second signal to determine that the first position resides to a first side of the second position; and
  determining that the arm of the user resides to the first side of the body of the user based on the first position residing to the first side of the second position, wherein the first side comprises a right side or a left side.

16. The non-transitory computer-readable medium of claim 15, further comprising the step of determining that the user contacted the multi-touch display based on the signal received from the touch-based sensor embedded in the multi-touch display.

17. A multi-touch tabletop, comprising:
  a multi-touch display;
  a processing unit; and
  a memory unit, wherein the memory unit includes a multi-touch touch tabletop management application configured to:
    receive a first signal from a first ring of proximity sensors indicating that a first object resides at or within a first distance from the multi-touch tabletop;
    receive a second signal from a second ring of proximity sensors indicating that a second object resides at or within a second distance from the multi-touch tabletop;
    determine that the first object represents a body of a user and the second object represents a portion of an arm of the user based on the first distance exceeding the second distance; and
    in response, generate an instruction.

18. The system of claim 17, wherein the application is further configured to:
  receive a third signal from a third ring of proximity sensors indicating that a third object resides at or within a third distance from the multi-touch tabletop; and
  receive a signal from a touch-based sensor embedded in a multi-touch display.

* * * * *